United States Patent
Berger

(10) Patent No.: US 12,259,008 B2
(45) Date of Patent: Mar. 25, 2025

(54) MAIN DRIVE SHAFT OR DEFLECTION SHAFT OF AN ESCALATOR OR MOVING WALKWAY

(71) Applicant: INVENTIO AG, Hergiswil (CH)

(72) Inventor: Michael Berger, Königstetten (AT)

(73) Assignee: Inventio AG, Hergiswil (CH)

( * ) Notice: Subject to any disclaimer, the term of this patent is extended or adjusted under 35 U.S.C. 154(b) by 55 days.

(21) Appl. No.: 18/261,175

(22) PCT Filed: Jan. 6, 2022

(86) PCT No.: PCT/EP2022/050190
§ 371 (c)(1),
(2) Date: Jul. 12, 2023

(87) PCT Pub. No.: WO2022/161751
PCT Pub. Date: Aug. 4, 2022

(65) Prior Publication Data
US 2024/0068521 A1 Feb. 29, 2024

(30) Foreign Application Priority Data
Jan. 27, 2021 (EP) .................................. 21153816

(51) Int. Cl.
*F16C 35/063* (2006.01)
*B66B 23/02* (2006.01)
*F16D 1/08* (2006.01)

(52) U.S. Cl.
CPC ............ *F16C 35/063* (2013.01); *B66B 23/02* (2013.01); *F16D 1/0847* (2013.01);
(Continued)

(58) Field of Classification Search
CPC .... F16C 35/063; F16C 2326/58; B66B 23/02; B66B 23/00; B66B 23/20; B66B 23/22;
(Continued)

(56) References Cited

U.S. PATENT DOCUMENTS 4,484,674 A * 11/1984 Lunardi .................. B66B 23/14
198/860.3
4,535,880 A * 8/1985 Boltrek ................. B66B 23/028
198/330

(Continued)

FOREIGN PATENT DOCUMENTS

CN 204022237 U * 12/2014
DE 102018213647 A1 * 8/2019
(Continued)

OTHER PUBLICATIONS

International Search Report for PCT Application No. PCT/EP2022/050190 dated Mar. 25, 2022.

*Primary Examiner* — Gene O Crawford
*Assistant Examiner* — Muhammad Awais
(74) *Attorney, Agent, or Firm* — Knobbe, Martens, Olson & Bear, LLP

(57) ABSTRACT

An adjusting ring for a moving walkway or an escalator can include a hollow cylindrical annular body and at least one adjusting screw. An outside diameter of the annular body is greater than an inner outside ring diameter of an outer ring of a roller bearing arranged adjacently in the assembled state. Furthermore, the adjusting ring can include at least one annular groove arranged concentrically to the inside diameter in a lateral ring face of the annular body which is directed against the roller bearing in the assembled state.

19 Claims, 3 Drawing Sheets

(52) U.S. Cl.
CPC ...... *F16C 2326/58* (2013.01); *F16D 2300/06* (2013.01); *F16D 2300/08* (2013.01)

(58) Field of Classification Search
CPC ... B66B 23/24; F16D 1/0847; F16D 2300/06; F16D 2300/08; B65B 25/00; B65B 27/00; B65B 29/00; B65B 31/00
USPC .................................................. 198/338, 321
See application file for complete search history.

(56) References Cited

U.S. PATENT DOCUMENTS

| | | | | |
|---|---|---|---|---|
| 4,674,619 | A * | 6/1987 | Nakazawa | B66B 23/04 198/336 |
| 6,260,687 | B1 * | 7/2001 | Ulrich | B66B 23/026 198/330 |
| 7,451,867 | B2 * | 11/2008 | Berger | B66B 23/026 198/329 |
| 7,597,182 | B2 * | 10/2009 | Illedits | B66B 23/026 198/330 |
| 9,637,351 | B2 * | 5/2017 | Dai | B65G 23/06 |

FOREIGN PATENT DOCUMENTS

| | | | |
|---|---|---|---|
| EP | 1616834 | A2 | 1/2006 |
| EP | 1616834 | A3 | 5/2006 |
| EP | 1616834 | B1 | 10/2008 |

\* cited by examiner

MAIN DRIVE SHAFT OR DEFLECTION SHAFT OF AN ESCALATOR OR MOVING WALKWAY

TECHNICAL FIELD

The disclosure relates to an adjusting ring and an escalator or a moving walkway comprising an adjusting ring.

SUMMARY

In this description, the expression "escalator" is also intended to include "moving walkway," and the expression "step" also includes "moving walkway pallets."

The steps of an escalator are fastened to two transport chains and, together therewith, form a continuous, revolving step belt which runs over in each case a pair of transport chain wheels, at both ends of the escalator, one transport chain wheel pair belonging to the drive station and driving and deflecting the step belt, and the other transport chain wheel pair being part of a deflection station. Instead of the last-mentioned transport chain wheel pair, deflection arc rails can also be used in the deflection station, such that a transport chain wheel pair is present only in the drive station.

In an escalator or a moving walkway, a main drive shaft is installed at the upper stair head, the previously mentioned transport chain wheel pair being part of this main drive shaft. The main drive shaft is mounted at both ends in a support structure. This mounting should be as simple as possible to implement, since the main drive shaft must be dismantled in the case of bearing damage, which shaft can still weigh 500 kg despite the most lightweight design possible.

The main drive shaft drives the steps or pallets which are guided on track rails. In order to obtain a highly loadable, dimensionally stable and nevertheless weight-optimized construction, the main drive shaft is designed as a hollow shaft structure. A main drive shaft designed in this way has a stationary axle which is mounted in the support structure of the escalator. A hollow shaft having the transport chain wheel pair arranged thereon is arranged around this axle. The hollow shaft is rotatably mounted on the axle by means of roller bearings. The axle, which carries the hollow shaft, is typically firmly screwed to the support structure. Such a construction is described, for example, in EP 1 616 834 B1.

If a deflection shaft having a transport chain wheel pair is provided in the deflection station, this deflection shaft can be designed in the same design as the main drive shaft.

If the deflection station is also used as a tensioning station for the step belt, the axle will not be connected to the support structure in a rigid manner but rather by linear guides attached on both sides. Furthermore, a mechanism (springs, spindles) must be present in order to adjust the required tensioning force.

In the case of a roller bearing fault, extensive disassembly and assembly work is required, it being possible for the roller bearings to be removed and refitted only by longitudinal displacement up to the axle end. For the purpose of simpler maintenance and, in particular, due to the size of the roller bearing and the very limited space conditions, it is not necessary to press the roller bearings into the hollow shaft or press them onto the axle. Instead, they are secured against axial displacement by means of adjusting rings mounted on the axle.

Roller bearings are usually made of highly hardenable steels which have little corrosion resistance and therefore rust quickly. A steel type used is, for example, 100Cr6 (material no. 1.3505), a steel having a content of approximately 1% carbon and 1.5% chromium. Further steels, such as 100CrMnSi6-4 and 100CrMo7 are also used, the alloying elements manganese (Mn) and molybdenum (Mo) serving for better full hardenability.

Since escalators and moving walkways can be exposed to significant dirt and moisture, depending on the place of use and conditions of use, there is the possibility that damp dirt accumulates in the region of the roller bearings and, as a result, rust can form between the roller bearing and the hollow shaft or the axle, such that the roller bearing can almost no longer be released during replacement. In addition, the dirt can lead to considerable wear when the bearings are only greased, not sealed, if said dirt reaches the region of the rolling bodies.

An object of the present disclosure is therefore to provide simple and effective protection of the roller bearing from dirt and moisture which is cost-effective and enables at least equally simple assembly and/or disassembly of the roller bearing.

This object can be achieved by an adjusting ring having a hollow cylindrical annular body and at least one adjusting screw. The adjusting screw is arranged in a threaded hole which is formed continuously in the annular body and ends at an inside diameter of the annular body. Of course, the adjusting ring can also have a plurality of threaded holes, in each of which an adjusting screw is arranged. Preferably, these threaded holes extend in the annular body in the radial direction with respect to the central longitudinal axis of the annular body, and are arranged at the same angular dimensions with respect to one another.

The inside diameter of the annular body is matched to an axle of a main drive shaft or deflection shaft of an escalator or a moving walkway which is arranged so as to protrude in the assembled state. In other words, the inside diameter of the hollow cylindrical annular body is of such a size that it can be pushed over the axle without application of force. In this case, the inside diameter can have sufficient play with respect to the diameter of the axle.

In order to protect the roller bearing against environmental influences, an outside diameter of the annular body is greater than an inner outside ring diameter of an outer ring of a roller bearing of the main drive shaft arranged adjacently in the assembled state. This overlap already protects the region of the rolling bodies of the roller bearing very well. In addition, at least one annular groove arranged concentrically to the inside diameter is arranged in a lateral ring face of the annular body which is directed against the roller bearing in the assembled state. The annular groove is arranged in a zone in which a relative movement between the surfaces of the annular groove and the directly adjacent surfaces of the roller bearing and/or the hollow shaft takes place during a rotation of the main drive shaft. In this case, the annular groove can serve as a labyrinth seal, which at least effectively slows down the ingress of liquids and dirt. Over time, fibrous dirt such as dust can settle in the annular groove and form a kind of felt ring which effectively prevents further ingress of dirt and dust. This is assisted by lubricants of the bearing, which hold the fibrous dirt together and additionally prevent the ingress of liquid.

Since the adjusting ring is provided for securing the roller bearing against axial displacement, it is pushed completely onto the roller bearing and then the adjusting screws are tightened. In order to prevent friction between the lateral face and the part of the roller bearing (outer ring) that moves relative to the lateral face of the adjusting ring, a small distance must be present in the assembled state, at least between the adjusting ring and the outer ring of the roller bearing. This distance can, for example, be achieved by a narrow shim ring which is arranged between an inner ring of the roller bearing and the adjusting ring on the axle.

Instead of such a shim ring, in one embodiment of the adjusting ring a projecting annular projection can be formed on the annular body, in the region of the inside diameter. This annular projection protrudes from the lateral ring face, which contains the annular groove, and thus defines the envisaged distance between the lateral ring face and the adjacent outer ring of the roller bearing. Preferably, the projection outside diameter of the ring projection is smaller than the inner outside ring diameter of the outer ring of the roller bearing arranged adjacently in the assembled state.

In a further embodiment of the adjusting ring, a small groove diameter of the annular groove can be greater than the inside diameter of the outer ring of the roller bearing which is adjacent in the assembled state. As a result, the above-described sealing function of the adjusting ring in the region of the outer ring or even in the region of an end face of the hollow shaft is achieved.

Of course, it is not absolutely necessary that a seal should form of fibrous dirt. It is possible for a sealing element to already be provided during the assembly of the adjusting ring, which sealing element seals, all around, the gap that is present due to the provided distance between the adjusting ring and the adjacent roller bearing. For this purpose, the annular groove can be matched to an annular sealing element with respect to its groove diameter and its groove cross-section. In this case, the sealing element is arranged in the annular groove. In the installed state, the sealing element projects out of the annular groove with a predefined overhang. In this case, the overhang and the distance are matched to one another such that, on the one hand, the gap can be sealed and, on the other hand, the sealing element is not subject to significant wear in the overhanging region. The sealing pressure provided in this case depends on the material properties of the sealing material and the surface quality of the surface of the hollow shaft or of the outer ring of the roller bearing that moves relative to the adjusting ring and/or sealing element.

In a further embodiment of the adjusting ring, the annular groove can have an undercut by means of which an annular groove projection is formed in the material of the annular body. This groove projection is provided in order to secure a sealing element, inserted in the annular groove, against emerging axially from the annular groove.

An adjusting ring prepared for assembly can have all required adjusting screws and the sealing element inserted in the groove.

The sealing element can be produced from different materials, for example from a non-ferrous metal which has very good sliding properties. Of course, sealing elements made of composite materials can also be used. Preferably, the sealing element is an O-ring made of a polymer material, since such sealing elements exhibit good sealing properties and are moreover very inexpensive.

In a further embodiment of the adjusting ring, a lubrication hole having an inlet opening and an outlet opening can also be formed in the annular body, the outlet opening of said hole opening into the lateral ring face between the annular groove and the inside diameter of the annular body. The lubrication hole makes it possible to supply lubricant, such as lubricating grease or lubricating oil, to the directly adjacent roller bearing. In addition, the cavity between the axle, the roller bearing, the adjusting ring and the sealing element can also be filled with lubricant, preferably lubricating grease, via said lubrication hole. This additionally prevents the ingress of liquids, moisture and dirt, and also prevents condensate from forming in this cavity due to temperature change. As a result, corrosion of the roller bearing can be prevented, as a result of which a later bearing replacement is significantly simplified and the service life of the bearing is increased.

The inlet opening of the lubrication hole can be arranged, for example, on a side of the annular body opposite the lateral ring face.

Preferably, the inlet opening of the lubrication hole has a thread. As a result, for example a conventional lubrication nipple having a check valve can be mounted at the inlet opening, such that after the lubricant has been supplied it does not escape again from the lubrication hole. The inlet hole provided with a thread can of course also be closed using a simple threaded plug, such as a suitable, short hexagon screw having a sealing ring.

The lateral feeding of lubricants may be made more difficult by the support structure which is present in the immediate vicinity. In order to simplify the supply of lubricant, what is known as a lubrication nipple can be mounted in the thread, at 90°.

Alternatively, the inlet opening of the lubrication hole can also be arranged on a surface of the annular body which is delimited by the outside diameter.

As already mentioned at the outset, moving walkways or escalators have a drive station and a deflection station, the latter usually serving not only for deflecting, but also for tensioning, the step belt or pallet belt. The deflection station can be provided with a deflection shaft. The drive station comprises a main drive shaft. The deflection shaft or the main drive shaft comprises an axle, a hollow shaft arranged on the axle and having transport chain wheels arranged thereon, and at least one roller bearing arranged between the hollow shaft and the axle. The moving walkway or the escalator further comprises at least one adjusting ring which corresponds to one of the variants described above. This adjusting ring is fastened on the axle adjacently to the roller bearing by means of the at least one adjusting screw, the annular groove of the adjusting ring being directed against the roller bearing.

An annular sealing element, which protrudes from the annular groove with a predefined overhang, can be inserted in the annular groove of the adjusting ring. In this case, a distance, which is dependent on the predefined overhang, between the roller bearing and the adjusting ring is predefined. As described further above, this distance can be predetermined either by the width of a shim ring or by the annular projection protruding by a corresponding amount.

BRIEF DESCRIPTION OF THE DRAWINGS

Embodiments of the disclosure will be described below with reference to the accompanying drawings, neither the drawings nor the description being intended to be interpreted as limiting the disclosure. In the figures.

The drawings are merely schematic, and may not be to scale. In the different figures, identical reference signs denote identical or similar features.

DETAILED DESCRIPTION

Figure 1:
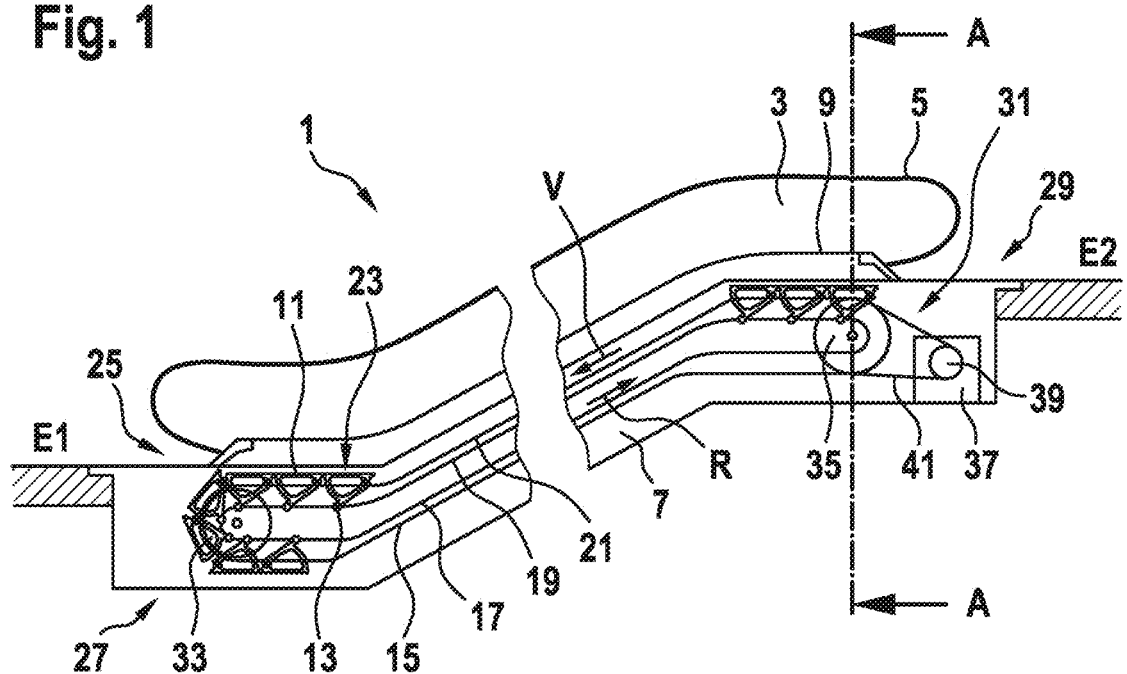
FIG. 1 is a schematic longitudinal sectional side view of an escalator comprising a support structure in which track rails and a revolving step belt are arranged between a first deflection region and a second deflection region.

FIG. 1 is a longitudinal sectional side view of an escalator 1 comprising two balustrades 3, only one balustrade 3 being visible due to the longitudinal section. A handrail 5 is arranged in a revolving manner on each balustrade 3. Furthermore, the escalator 1 has a support structure 7 which is shown in outline and carries the balustrades 3. The balustrades 3 have base plates 9, between which laterally guided steps 11 are arranged in a revolving manner. The moving walkway 1 connects, for example, a first floor E1 to a second floor E2. Rollers 13 of the steps 11 travel on track rails 15, 17, 19, 21, which are connected to the support structure 7 of the escalator 1. The support structure 7 can be a framework, a support, a foundation and the like.

The steps 11 are connected to one another by means of transport chains (not shown) so as to form a revolving step belt 23, this being shown only in part for better clarity. In the region of the first floor E1, the support structure 7 comprises a first deflection region 25 having a deflection station 27, and in the region of the second floor E2 it comprises a second deflection region 29 having a drive station 31, in which the step belt 23 is deflected between a forward movement V and a return movement R. On account of the indicated arrow direction of the forward movement V and the return movement R, in the embodiment shown users are conveyed from the second floor E2 to the first floor E1. Of course, operation of the escalator 1 in the opposite direction is also possible. In order to deflect the step belt 23, a deflection shaft 33 is rotatably arranged in the first deflection region 25, and a main drive shaft 35 is rotatably arranged in the second deflection region 29. The main drive shaft 35 is connected in a rotation-transmitting manner, by a drive chain 41, to a drive pinion 39 of a drive unit 37. Of course, the drive unit 37 can also be designed differently and be arranged at another location in the escalator 1, in order to drive the step belt 23.

Figure 2:
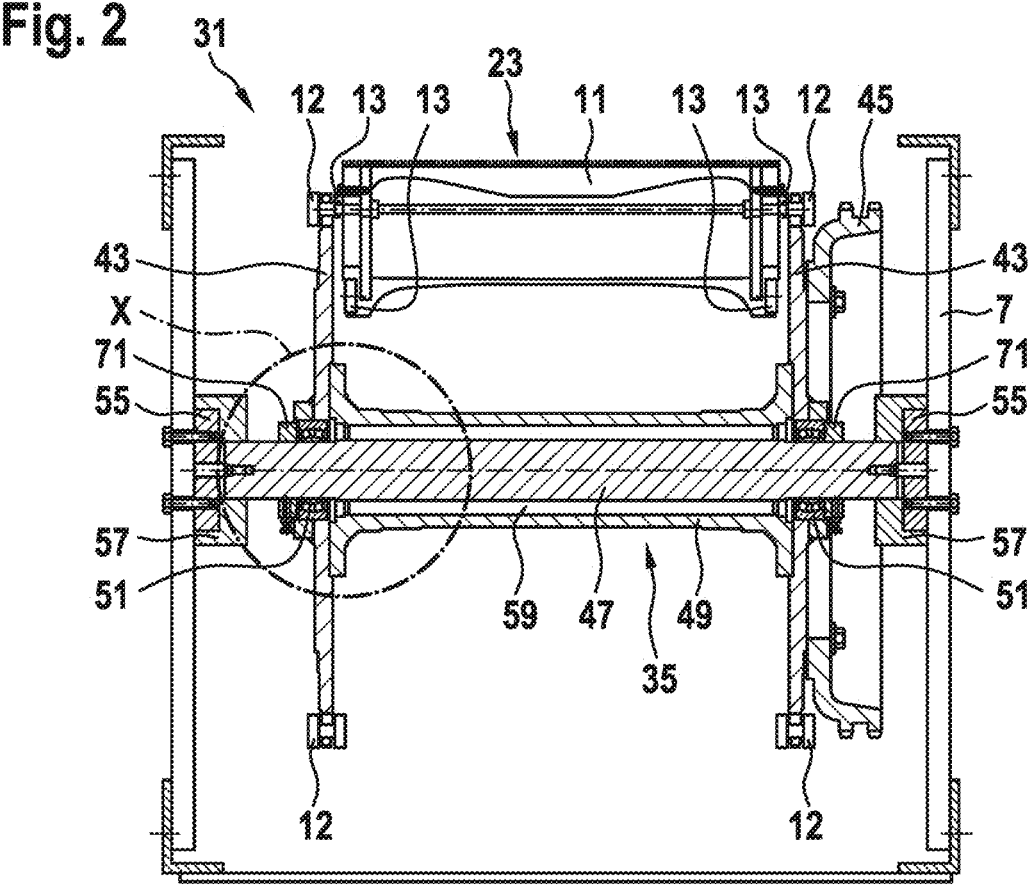
FIG. 2 is an enlarged view of the section A-A indicated in FIG. 1.
Figure 3:
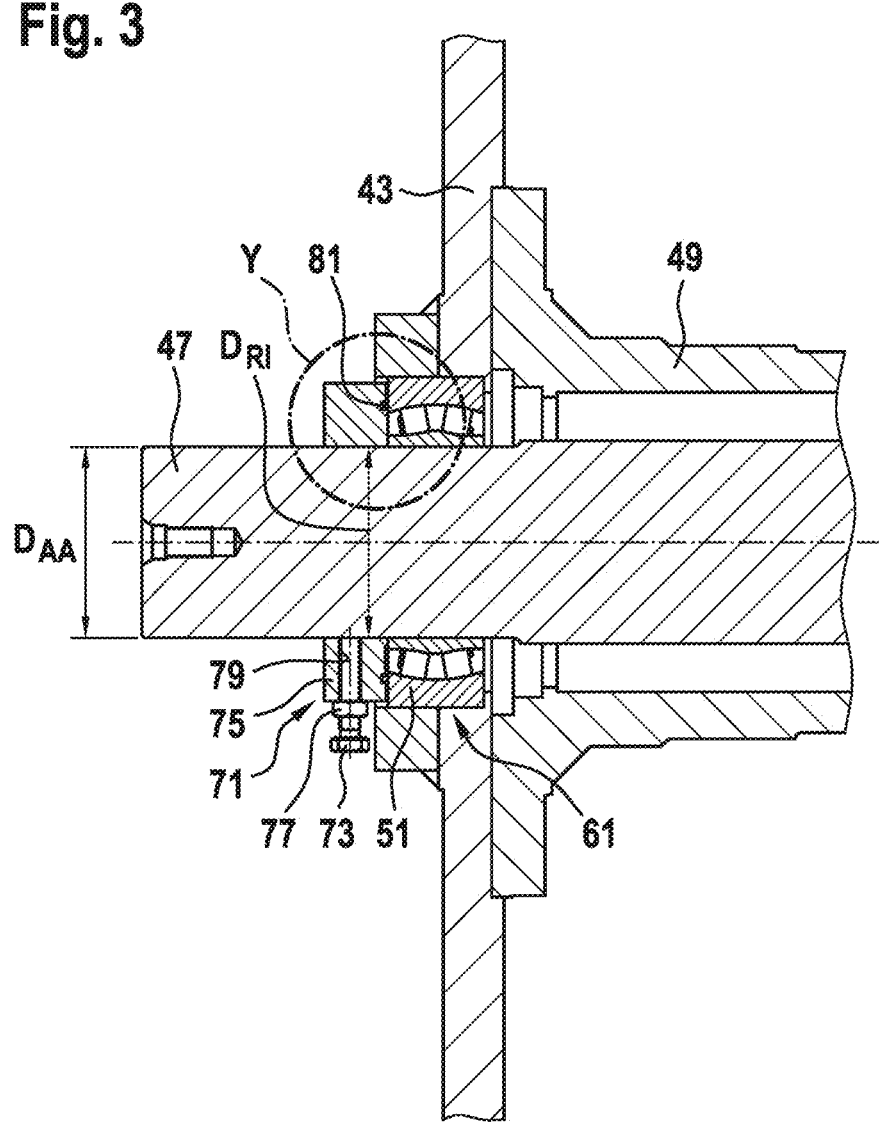
FIG. 3 is an enlarged view of the detail X indicated in FIG. 2.

FIG. 2 is an enlarged view of the section A-A through the drive station 31, indicated in FIG. 1. FIG. 3 is an enlarged view of the detail X indicated in FIG. 2. The two figures are described together in the following.

The sectional plane A-A shown in FIG. 2 also intersects the main drive shaft 35 arranged in the drive station 31. In order to obtain a highly loadable, dimensionally stable and nevertheless weight-optimized construction, the main drive shaft 35 is designed as a hollow shaft structure. A main drive shaft 35 designed in this way has a stationary axle 47 which is mounted in the support structure 7 of the escalator 1. Disk-shaped flanges 55 and cup washers 57 are used at both ends of the axle 47 as connection elements for connecting to the support structure 7. The axle 47 is typically firmly screwed to the support structure 7 by means of the flanges 55 and cup washers 57. A hollow shaft 49 having two transport chain wheels 43 fastened thereto is arranged on the axle 47. In other words, the axle 47 is arranged in the hole 59 of the hollow shaft 49. The transport chains 12 of the step belt 23 are guided and deflected via the transport chain wheels 43, the steps 11 being arranged between the transport chains 12.

The hollow shaft 49 and the transport chain wheels 43 connected to one another via the hollow shaft 49 are rotatably mounted on the axle 47 by means of two roller bearings 51. Depending on the embodiment, the roller bearings 51 are arranged in recesses 61 (see FIG. 3) of the transport chain wheels 43 or of the hollow shaft 49 provided for this purpose.

In order that the roller bearings 51 cannot move out of the recesses 61 during operation, they are secured against an axial displacement in each case by an adjusting ring 71, which is fastened on the axle 47, adjacently to the roller bearing 51, by means of an adjusting screw 73. The adjusting ring 71 comprises a hollow cylindrical annular body 75. The adjusting screw 73 is arranged in a threaded hole 79 of the annular body 75. In order that the adjusting screw can be tightened against the axle 47, the threaded hole 79 is formed right through the annular body 75 and ends at an inside diameter $D_{RI}$ of the annular body 75. The inside diameter $D_{RI}$ of the annular body 75 is matched to the axle 47 or its outside diameter DA, such that the adjusting ring 71 can easily be pushed over the axle 47 but nevertheless does not have too much radial play with respect to the axle 47 (sliding fit). In order to secure a tightened adjusting screw 73, a lock nut 77 can be provided, as shown. Of course, other securing means, such as anaerobic adhesives, can also be used in order to secure the adjusting screw 73 in the threaded hole 79 against release.

As already mentioned in the description of FIGS. 1 and 2, the escalator 1 of the present embodiment has a main drive shaft 35 and a deflection shaft 33. These are substantially identical in design, such that the same components can be used for both shafts 33, 35. Since the main drive shaft 35 drives the steps 11 or the step belt 23, it differs from the deflection shaft 33 only by a drive sprocket 45, which is arranged laterally on one of the two transport chain wheels 43 and is screwed thereto.

As FIG. 3 shows, the adjusting ring 71 according to the disclosure has at least one annular groove 81. Variants of this annular groove 81 and further specific embodiments of the adjusting ring 71 are shown in FIGS. 4 and 5, which reproduce the detail Y indicated in FIG. 3 in an enlarged view.

Figure 4:
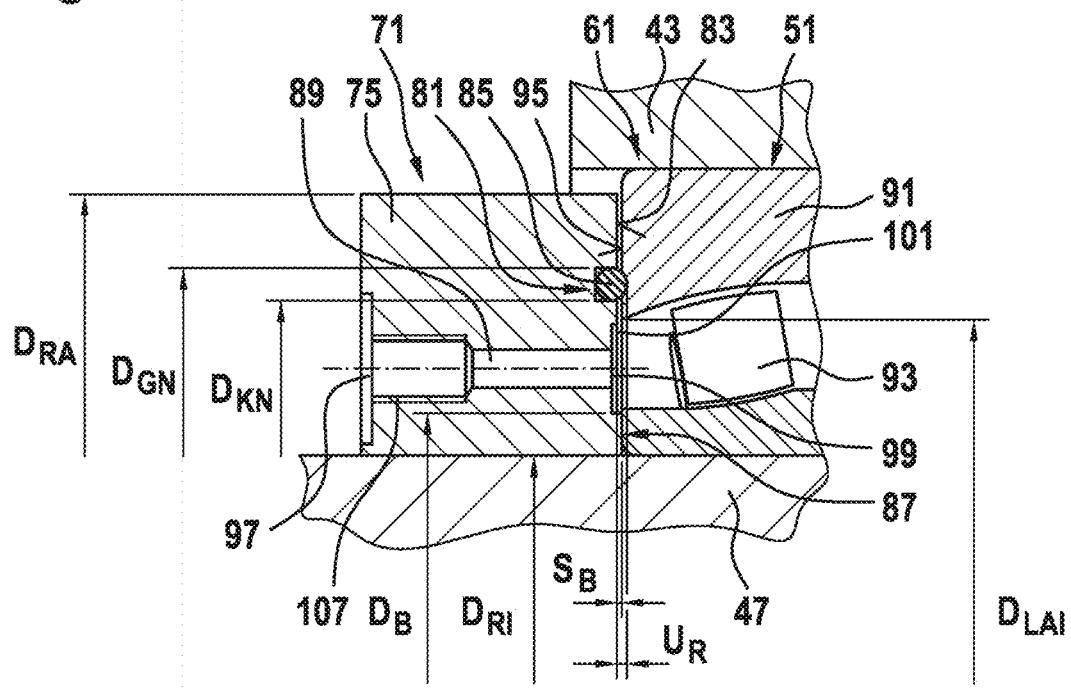
FIG. 4 is an enlarged view of the detail Y indicated in FIG. 3, in a first embodiment.

As shown in FIG. 4, an outside diameter $D_{RA}$ of the annular body 75 is greater than an inner outside ring diameter $D_{LAI}$ of an outer ring 91 of a roller bearing 51 arranged adjacently in the assembled state. As a result, in the assembled state, the roller bearing 51 is covered at the end face, at least up to over the region of its rolling bodies 93, by the annular body 75 of the adjusting ring 71. In addition, at least one annular groove 81 arranged concentrically to the inside diameter $D_{RI}$ is arranged in a lateral ring face 83 of the annular body 75 which is directed against the roller bearing 51 in the assembled state. In other words, the lateral ring face 83 cannot only have an annular groove 81, as shown, but rather two and more annular grooves 81, which are arranged concentrically to one another and to the inside diameter $D_{RI}$ the annular body 75.

Figure 5:
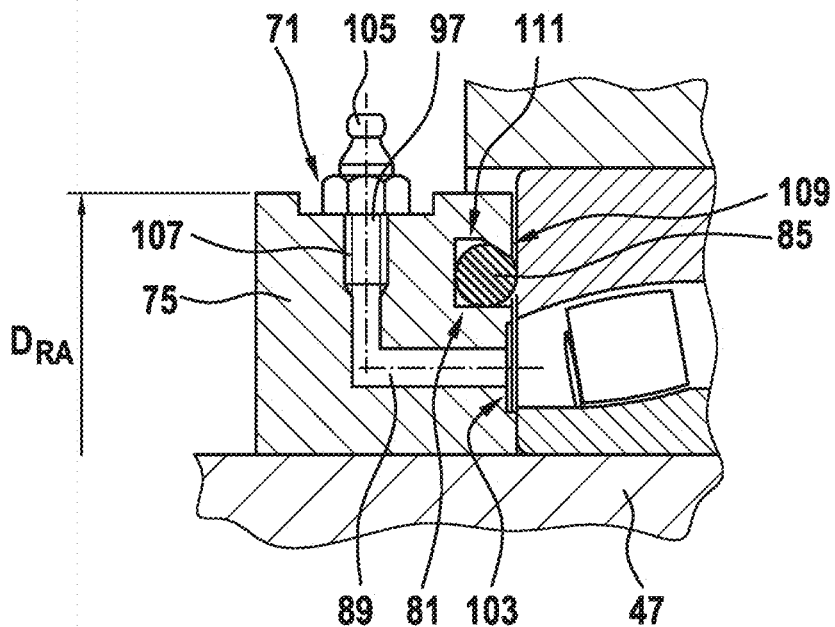
FIG. 5 is an enlarged view of the detail Y indicated in FIG. 3, in a second embodiment.

As also shown in FIGS. 4 and 5, a small groove diameter $D_{KN}$ of the annular groove 81 is greater than the inner outside ring diameter $D_{LAI}$ of the outer ring 91 of the roller bearing 51 which is adjacent in the assembled state. As a result, the sealing zone of the annular groove 81 is located in the region of the outer ring 91, such that dirt can remain trapped in the region of the annular groove 81. In order to increase the protective effect, in the present embodiment a sealing element 85 is arranged in the annular groove 81. As a result, no dirt and no moisture can get into the region of the rolling bodies 93. As shown, the sealing element 85 can be an O-ring made of a flexible polymer material.

With respect to its groove diameter $D_{KN}$, $D_N$ and its groove cross-section, the annular groove 81 is matched to the annular sealing element 85, such that said element protrudes from the annular groove 81 with a predefined overhang $U_R$ when it is inserted in the annular groove 81.

Furthermore, an annular projection 87 is formed on the annular body 75, in the region of the inside diameter $D_{IR}$, which ring projection protrudes by a distance $S_B$ from the lateral ring face 83 which contains the annular groove 81. In this case, a projection outside diameter $D_B$ of the ring projection 87 is smaller than the inner outside ring diameter $D_{LAI}$ of the outer ring 91 of the roller bearing 51 arranged adjacently in the assembled state.

In order to achieve a sufficient sealing effect against the ingress of moisture, the sealing element 85 must press against the adjacent lateral face 95 of the roller bearing outer ring 91 with a predetermined force. This pressing is shown symbolically in FIG. 4 by the sealing element 85 penetrating into the outer ring 91. In fact, however, the lateral face of the outer ring 91 is flat and as smooth as possible, such that the sealing element 85 rests only against the lateral face 95 and is compressed between the adjusting ring 71 and the roller bearing 51. Since the sealing element 85 has flexible material properties, it generates this force depending on the difference between the overhang $U_R$ and the distance $S_B$. In other words, the ring projection 87 defines a distance $S_B$ between the roller bearing 51 and the adjusting ring 71, which, due to the provided force or sealing pressure, is dimensioned in a manner dependent on the predefined overhang $U_R$.

As is furthermore shown in FIG. 4, a lubrication hole 89 having an inlet opening 97 and an outlet opening 99 is formed in the annular body 75. The outlet opening 99 opens into the lateral ring face 83 of the annular body 75 between the annular groove 81 and the inside diameter $D_{RI}$. Owing to the lubrication hole 89, it is possible, on the one hand, to supply lubricant, such as lubricating grease or lubricating oil, to the directly adjacent roller bearing 51. In addition, the cavity 101 between the axle 47, the roller bearing 51, the adjusting ring 71 and the sealing element 85 can also hereby be filled with lubricant, preferably lubricating grease. This additionally prevents the ingress of liquids, moisture and dirt, and also prevents condensate from being able to form in this cavity due to temperature change. As a result, corrosion of the roller bearing 51 in the recess 61 can be prevented, as a result of which a later bearing replacement is significantly simplified. In order to achieve a better distribution of the lubricant in the cavity 101, a lubricating groove 103 (see FIG. 5) can also be formed in the annular body 75. The design of said groove is based on the existing manufacturing possibilities for the adjusting ring 71 and on the properties of the lubricant, which is why further explanations regarding an ideal cross-sectional profile of the lubricating groove 103 are dispensed with at this point. The inlet opening 97 of the lubrication hole 89 is arranged on a side of the annular body 75 opposite the lateral ring face 83. The inlet opening 97 of the lubrication hole 89 has a thread 107, into which a connection (not shown) of a lubricant press can be screwed. In order to prevent lubricant, which is filled in, from escaping, a screw comprising a sealing ring can be screwed in as a stopper after the connection has been removed.

FIG. 5 also shows the detail Y indicated in FIG. 3, but with an adjusting ring 71 in an alternative embodiment. Its annular groove 81 has an undercut 111, by means of which an annular groove projection 109 is formed in the material of the annular body 75. This groove projection 109 is provided for securing a sealing element 85, inserted in the annular groove 81, against emerging axially from the annular groove 81. Furthermore, the inlet opening 97 of the lubrication hole 89 is arranged on a surface of the annular body 75 that is delimited by the outside diameter DA. The inlet opening 97 is also provided with a conventional lubrication nipple 105 comprising a check valve, such that the maintenance personnel can easily refill lubricant as required without first removing a locking screw.

Although FIG. 1 shows an escalator 1 comprising a step belt 23, it is obvious that the present disclosure is also suitable for a moving walkway comprising a pallet belt. It is also obvious that the different characteristics of annular grooves 81 and arrangements of inlet openings 97 can be combined with one another.

Finally, it should be noted that terms such as "comprising," "having," etc., do not exclude other elements or steps, and terms such as "a" or "an" do not exclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. An adjusting ring comprising:
a hollow cylindrical annular body; and
at least one adjusting screw;
wherein:
the adjusting screw is arranged in a threaded hole that is formed through the annular body and ends at an inside diameter of the annular body,
the inside diameter of the annular body is matched to an axle of a main drive shaft or a deflection shaft of an escalator or a moving walkway that is arranged so as to protrude in the assembled state,
an outside diameter of the annular body is greater than an inner outside ring diameter of an outer ring of a roller bearing of the main drive shaft or deflection shaft arranged adjacently in the assembled state, and
at least one annular groove arranged concentrically to the inside diameter is formed in a lateral ring face of the annular body which is directed against the roller bearing in the assembled state.

2. The adjusting ring of claim 1, wherein a small groove diameter of the annular groove is greater than the inner outside ring diameter of the outer ring of the roller bearing which is adjacent in the assembled state.

3. The adjusting ring of claim 2, wherein an annular projection is formed on the annular body in the region of the inside diameter, the annular projection protruding by a distance from the lateral ring face that contains the annular groove, and its projection outside diameter being smaller than the inner outside ring diameter of the outer ring of the roller bearing arranged adjacently in the assembled state.

4. The adjusting ring of claim 3, wherein a lubrication hole having an inlet opening and an outlet opening is formed in the annular body, wherein the outlet opening thereof opens into the lateral ring face between the annular groove and the inside diameter.

5. The adjusting ring of claim 3, wherein the annular groove is matched, with respect to its groove diameter and its groove cross-section, to an annular sealing element which is provided for being arranged in the annular groove and for protruding from the annular groove with a predefined overhang in the installed state.

6. The adjusting ring of claim 1, wherein an annular projection is formed on the annular body, in the region of the inside diameter, which annular projection protrudes by a distance from the lateral ring face that contains the annular groove, and its projection outside diameter is smaller than the inner outside ring diameter of the outer ring of the roller bearing arranged adjacently in the assembled state.

7. The adjusting ring of claim 6, wherein a lubrication hole having an inlet opening and an outlet opening is formed in the annular body, wherein the outlet opening thereof opens into the lateral ring face between the annular groove and the inside diameter.

8. The adjusting ring of claim 1, wherein the annular groove is matched, with respect to its groove diameter and its groove cross-section, to an annular sealing element which is provided for being arranged in the annular groove and for protruding from the annular groove with a predefined overhang in the installed state.

9. The adjusting ring of claim 8, wherein a lubrication hole having an inlet opening and an outlet opening is formed in the annular body, wherein the outlet opening thereof opens into the lateral ring face between the annular groove and the inside diameter.

10. The adjusting ring of claim 6, wherein the annular groove has an undercut forming an annular groove projection is formed in the material of the annular body, and which groove projection is provided for securing a sealing element inserted in the annular groove against emerging axially from the annular groove.

11. The adjusting ring of claim 10, wherein said ring has a sealing element.

12. The adjusting ring of claim 11, wherein the sealing element is an O-ring made of a polymer material.

13. The adjusting ring of claim 12, wherein a lubrication hole having an inlet opening and an outlet opening is formed in the annular body, wherein the outlet opening thereof opens into the lateral ring face between the annular groove and the inside diameter.

14. The adjusting ring of claim 13, wherein the inlet opening of the lubrication hole has a thread.

15. The adjusting ring of claim 13, wherein the inlet opening of the lubrication hole is arranged on a side of the annular body opposite the lateral ring face.

16. The adjusting ring of claim 13, wherein the inlet opening of the lubrication hole is arranged on a radial surface of the annular body which is delimited by the external diameter.

17. The adjusting ring of claim 16, wherein the inlet opening of the lubrication hole has a thread.

18. The moving walkway or escalator comprising the deflection shaft or the main drive shaft that comprises at least one axle and the roller bearing arranged on the axle, wherein the moving walkway or the escalator further comprises at least one adjusting ring according to claim 1, which is fastened on the axle adjacently to the roller bearing by the adjusting screw, the annular groove of the adjusting ring being directed against the roller bearing.

19. The walkway or escalator according to claim 18, wherein an annular sealing element is inserted in the annular groove of the adjusting ring, which sealing element protrudes from the annular groove with a predefined overhang, and wherein a distance that is dependent on the predefined overhang is defined between the roller bearing and the adjusting ring.

* * * * *